(12) United States Patent
Rao

(10) Patent No.: US 7,593,876 B2
(45) Date of Patent: Sep. 22, 2009

(54) SYSTEM AND METHOD FOR PROCESSING PARTIALLY UNSTRUCTURED DATA

(75) Inventor: Srinivasan N. Rao, New York, NY (US)

(73) Assignee: JP Morgan Chase Bank, New York, NY (US)

(*) Notice: Subject to any disclaimer, the term of this patent is extended or adjusted under 35 U.S.C. 154(b) by 899 days.

(21) Appl. No.: 10/740,058

(22) Filed: Dec. 18, 2003

(65) Prior Publication Data

US 2005/0086170 A1    Apr. 21, 2005

Related U.S. Application Data

(60) Provisional application No. 60/511,591, filed on Oct. 15, 2003.

(51) Int. Cl.
*G06Q 40/00* (2006.01)
(52) U.S. Cl. .................. 705/35; 705/2; 705/3
(58) Field of Classification Search ............. 705/35–45, 705/2, 3
See application file for complete search history.

(56) References Cited

U.S. PATENT DOCUMENTS

| | | | |
|---|---|---|---|
| 3,665,483 A | 5/1972 | Becker et al. | |
| 3,896,266 A | 7/1975 | Waterbury | |
| 4,169,285 A | 9/1979 | Walker | |
| D263,344 S | 3/1982 | McCarthy et al. | |
| 4,322,613 A | 3/1982 | Oldenkamp | |
| 4,396,985 A | 8/1983 | Ohara | |
| 4,523,297 A | 6/1985 | Ugon et al. | |
| 4,558,318 A | 12/1985 | Goldman et al. | |
| 4,634,845 A | 1/1987 | Riley et al. | |
| 4,648,038 A | 3/1987 | Roberts et al. | |
| 4,651,150 A | 3/1987 | Goldman et al. | |
| 4,711,993 A | 12/1987 | Kosednar et al. | |
| 4,739,322 A | 4/1988 | Goldman | |
| 4,739,478 A | 4/1988 | Roberts et al. | |
| 4,742,457 A | 5/1988 | Leon et al. | |
| 4,746,787 A | 5/1988 | Okasa et al. | |
| 4,752,877 A | 6/1988 | Roberts et al. | |
| 4,816,824 A | 3/1989 | Goldman et al. | |
| 4,870,260 A | 9/1989 | Niepolomski et al. | |
| 4,916,296 A | 4/1990 | Streck | |
| 4,933,842 A | 6/1990 | Durbinet et al. | |
| 4,947,028 A | 8/1990 | Gorog | |
| 4,999,617 A | 3/1991 | Uemura | |
| 5,047,614 A | 9/1991 | Bianco | |

(Continued)

FOREIGN PATENT DOCUMENTS

WO    98/43170    10/1998

(Continued)

OTHER PUBLICATIONS

Fixprotocol, Financial Information Exchange, Oct. 1998.*

(Continued)

*Primary Examiner*—Richard C Weisberger
(74) *Attorney, Agent, or Firm*—Lowenstein Sandler PC

(57) ABSTRACT

A system and method for processing partially unstructured data relating to a financial security. The system and method resolve first- and second-identifying data from the partially unstructured data and determine whether a security is defined by the first-identifying data and the second-identifying data. Additionally, the system and method resolve trade information relating to the security identifier from the partially unstructured data. If a security is defined by the resolved identifying data, a security identifier representing the defined security, along with the trade information relating to the defined security, are output.

6 Claims, 5 Drawing Sheets

U.S. PATENT DOCUMENTS

| | | | |
|---|---|---|---|
| 5,121,469 A | 6/1992 | Richards et al. | |
| 5,175,682 A | 12/1992 | Higashiyama | |
| 5,222,019 A | 6/1993 | Yoshino et al. | |
| 5,237,620 A | 8/1993 | Deaton | |
| 5,241,161 A | 8/1993 | Zuta | |
| 5,249,044 A | 9/1993 | Von Kohorn | |
| 5,252,815 A | 10/1993 | Pernet | |
| 5,257,369 A | 10/1993 | Skeen et al. | |
| 5,262,860 A | 11/1993 | Fitzpatrick | |
| 5,270,922 A | 12/1993 | Higgins | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,308,959 A | 5/1994 | Cherry | |
| 5,339,239 A | 8/1994 | Manabe et al. | |
| 5,380,991 A | 1/1995 | Valencia | |
| 5,388,165 A | 2/1995 | Gabriel et al. | |
| 5,396,650 A | 3/1995 | Terauchi | |
| 5,419,890 A | 5/1995 | Saidi | |
| 5,438,186 A | 8/1995 | Nair | |
| 5,444,616 A | 8/1995 | Nair | |
| 5,450,134 A | 9/1995 | Legate | |
| 5,454,104 A | 9/1995 | Steidlmayer et al. | |
| 5,462,438 A | 10/1995 | Becker et al. | |
| 5,479,532 A | 12/1995 | VanHorn et al. | |
| 5,488,571 A | 1/1996 | Jacobs | |
| 5,497,317 A | 3/1996 | Hawkins et al. | |
| 5,506,394 A | 4/1996 | Plesko | |
| 5,508,731 A | 4/1996 | Kohorn | |
| 5,517,406 A | 5/1996 | Harris et al. | |
| 5,523,794 A | 6/1996 | Mankovitz | |
| 5,535,147 A | 7/1996 | Jacobs | |
| 5,544,040 A | 8/1996 | Gerbaulet | |
| 5,550,358 A | 8/1996 | Tait et al. | |
| 5,557,334 A | 9/1996 | Legate | |
| 5,557,798 A | 9/1996 | Skeen et al. | |
| 5,563,783 A | 10/1996 | Stolfo et al. | |
| 5,564,073 A | 10/1996 | Takahisa | |
| 5,592,379 A | 1/1997 | Finfrock et al. | |
| 5,594,493 A | 1/1997 | Nemirofsky | |
| 5,602,936 A | 2/1997 | Lynn | |
| 5,604,542 A | 2/1997 | Dedrick | |
| 5,649,186 A | 7/1997 | Ferguson | 395/610 |
| 5,652,602 A | 7/1997 | Fishman | |
| 5,664,110 A | 9/1997 | Green et al. | |
| 5,665,953 A | 9/1997 | Mazzamuto | |
| 5,671,285 A | 9/1997 | Newman | |
| 5,675,746 A | 10/1997 | Marshall | |
| 5,678,046 A | 10/1997 | Cahill et al. | |
| 5,706,502 A | 1/1998 | Foley et al. | |
| 5,710,889 A | 1/1998 | Clark et al. | |
| 5,724,593 A | 3/1998 | Hargrave, III et al. | 395/757 |
| 5,728,998 A | 3/1998 | Novis et al. | |
| 5,734,154 A | 3/1998 | Jachimowicz et al. | |
| 5,736,727 A | 4/1998 | Nakata | |
| 5,744,789 A | 4/1998 | Kashi | |
| 5,748,780 A | 5/1998 | Stolfo | |
| 5,751,953 A | 5/1998 | Sheils | |
| 5,763,862 A | 6/1998 | Jachimowicz | |
| 5,767,896 A | 6/1998 | Nemirofsky | |
| 5,770,849 A | 6/1998 | Novis et al. | |
| 5,774,882 A | 6/1998 | Keen | |
| 5,778,157 A | 7/1998 | Oatman et al. | 395/51 |
| 5,787,402 A | 7/1998 | Potter et al. | |
| 5,789,733 A | 8/1998 | Jachimowicz et al. | |
| 5,804,806 A | 9/1998 | Haddad | |
| 5,805,719 A | 9/1998 | Pare et al. | |
| 5,806,044 A | 9/1998 | Powell | |
| 5,806,047 A | 9/1998 | Hackel et al. | |
| 5,806,048 A | 9/1998 | Kiron et al. | |
| 5,815,127 A | 9/1998 | Jacobs | |
| 5,819,273 A | 10/1998 | Vora et al. | 707/10 |
| 5,832,461 A | 11/1998 | Leon et al. | |
| 5,845,266 A | 12/1998 | Lupien et al. | |
| 5,854,595 A | 12/1998 | Williams | |
| 5,864,827 A | 1/1999 | Wilson | |
| 5,870,155 A | 2/1999 | Erlin | |
| 5,880,725 A | 3/1999 | Southgate | |
| 5,880,769 A | 3/1999 | Nemirofsky | |
| 5,890,140 A | 3/1999 | Clark et al. | |
| 5,897,625 A | 4/1999 | Gustin | |
| 5,898,157 A | 4/1999 | Mangili et al. | |
| 5,913,214 A | 6/1999 | Madnick et al. | 707/10 |
| 5,917,965 A | 6/1999 | Cahill et al. | |
| 5,918,218 A | 6/1999 | Harris et al. | |
| 5,922,044 A | 7/1999 | Banthia | |
| 5,930,217 A | 7/1999 | Kayanuma | |
| 5,940,810 A | 8/1999 | Traub et al. | |
| 5,940,844 A | 8/1999 | Cahill et al. | |
| 5,944,784 A | 8/1999 | Simonoff et al. | |
| 5,946,667 A | 8/1999 | Tull, Jr. et al. | |
| 5,950,176 A | 9/1999 | Keiser et al. | |
| 5,963,659 A | 10/1999 | Cahill et al. | |
| 5,966,531 A | 10/1999 | Skeen et al. | |
| 5,966,672 A | 10/1999 | Knupp | |
| 5,970,479 A | 10/1999 | Shepherd | |
| 5,986,673 A | 11/1999 | Martz | |
| 5,995,943 A | 11/1999 | Bull et al. | 705/14 |
| 5,995,948 A | 11/1999 | Whitford | |
| 6,003,770 A | 12/1999 | Schilling | |
| 6,006,206 A | 12/1999 | Smith et al. | |
| 6,012,046 A | 1/2000 | Lupien et al. | |
| 6,018,714 A | 1/2000 | Risen et al. | |
| 6,018,721 A | 1/2000 | Aziz et al. | |
| 6,023,280 A | 2/2000 | Becker et al. | |
| 6,029,146 A | 2/2000 | Hawkins et al. | |
| 6,029,147 A | 2/2000 | Horadan et al. | |
| 6,029,890 A | 2/2000 | Austin | |
| 6,032,137 A | 2/2000 | Hallard | |
| 6,035,287 A | 3/2000 | Stallaert et al. | |
| 6,049,783 A | 4/2000 | Segal et al. | |
| 6,052,673 A | 4/2000 | Leon et al. | |
| 6,055,522 A | 4/2000 | Krishna et al. | |
| 6,058,378 A | 5/2000 | Clark et al. | |
| 6,061,662 A | 5/2000 | Makivic | |
| 6,064,984 A | 5/2000 | Ferguson et al. | |
| 6,073,104 A | 6/2000 | Field | |
| 6,073,115 A | 6/2000 | Marshall | |
| 6,078,914 A | 6/2000 | Redfern | 707/3 |
| 6,078,956 A | 6/2000 | Bryant et al. | |
| 6,081,774 A | 6/2000 | de Hita et al. | 704/9 |
| 6,088,685 A | 7/2000 | Kiron et al. | |
| 6,092,056 A | 7/2000 | Tull, Jr. et al. | |
| 6,105,005 A | 8/2000 | Fuhrer | |
| 6,131,082 A | 10/2000 | Hargrave, III et al. | 704/7 |
| 6,134,600 A | 10/2000 | Liu | |
| 6,148,298 A | 11/2000 | LaStrange et al. | 707/5 |
| 6,173,270 B1 | 1/2001 | Cristofich et al. | |
| 6,173,276 B1 | 1/2001 | Kant et al. | |
| 6,178,420 B1 | 1/2001 | Sassano | 707/6 |
| 6,181,837 B1 | 1/2001 | Cahill et al. | |
| 6,185,567 B1 | 2/2001 | Ratnaraj et al. | |
| 6,195,647 B1 | 2/2001 | Martyn et al. | |
| 6,226,623 B1 | 5/2001 | Schein et al. | |
| 6,233,566 B1 | 5/2001 | Levine et al. | |
| 6,236,972 B1 | 5/2001 | Shkedy | |
| 6,236,977 B1 | 5/2001 | Verba et al. | |
| 6,243,670 B1 | 6/2001 | Bessho et al. | 704/9 |
| 6,260,021 B1 | 7/2001 | Wong et al. | |
| 6,263,321 B1 | 7/2001 | Daughtery, III | |
| 6,263,335 B1 | 7/2001 | Paik et al. | 707/5 |
| 6,266,683 B1 | 7/2001 | Yehuda et al. | |
| 6,272,474 B1 | 8/2001 | Garcia | |
| 6,275,229 B1 | 8/2001 | Weiner et al. | |

| | | | | | |
|---|---|---|---|---|---|
| 6,278,982 B1 | 8/2001 | Korhammer et al. | 2002/0022956 A1 | 2/2002 | Ukrainczyk et al. ............ 704/9 |
| 6,282,537 B1 | 8/2001 | Madnick et al. ................ 707/4 | 2002/0023053 A1 | 2/2002 | Szoc et al. |
| 6,285,986 B1 | 9/2001 | Andrews | 2002/0026405 A1 | 2/2002 | Haar |
| 6,285,989 B1 | 9/2001 | Shoham | 2002/0026449 A1 | 2/2002 | Azencott ................. 707/104.1 |
| 6,304,858 B1 | 10/2001 | Mosler et al. | 2002/0026462 A1 | 2/2002 | Shotton, Jr. et al. ......... 707/523 |
| 6,313,854 B1 | 11/2001 | Gibson | 2002/0029183 A1 | 3/2002 | Vlahoplus et al. |
| 6,317,726 B1 | 11/2001 | O'Shaughnessy | 2002/0032644 A1 | 3/2002 | Corby et al. |
| 6,317,728 B1 | 11/2001 | Kane | 2002/0035561 A1 | 3/2002 | Archer et al. ................... 707/6 |
| 6,321,212 B1 | 11/2001 | Lange | 2002/0042767 A1 | 4/2002 | Kwan |
| 6,323,881 B1 | 11/2001 | Broulik et al. | 2002/0049666 A1 | 4/2002 | Reuter et al. |
| 6,332,163 B1 | 12/2001 | Bowman-Amuah | 2002/0054115 A1 | 5/2002 | Mack et al. |
| 6,338,055 B1 | 1/2002 | Hagmann et al. | 2002/0059129 A1 | 5/2002 | Kemp |
| 6,338,068 B1 | 1/2002 | Moore et al. | 2002/0059141 A1 | 5/2002 | Davies et al. |
| 6,343,287 B1 | 1/2002 | Kumar et al. | 2002/0065752 A1 | 5/2002 | Lewis |
| 6,347,307 B1 | 2/2002 | Sandhu et al. | 2002/0065755 A1 | 5/2002 | Shlafman et al. |
| 6,349,291 B1 | 2/2002 | Varma | 2002/0069157 A1 | 6/2002 | Jordan |
| 6,356,933 B2 | 3/2002 | Mitchell et al. | 2002/0073007 A1 | 6/2002 | Ayache |
| 6,360,210 B1 | 3/2002 | Wallman | 2002/0078253 A1 | 6/2002 | Szondy et al. |
| 6,366,908 B1 | 4/2002 | Chong et al. ................... 707/3 | 2002/0087373 A1 | 7/2002 | Dickstein et al. |
| 6,381,585 B1 | 4/2002 | Maples et al. | 2002/0087454 A1 | 7/2002 | Calo et al. |
| 6,381,586 B1 | 4/2002 | Glasserman et al. | 2002/0087455 A1 | 7/2002 | Tsagarakis et al. |
| 6,385,660 B2 | 5/2002 | Griesemer et al. | 2002/0087457 A1 | 7/2002 | Madeley et al. |
| 6,389,413 B2 | 5/2002 | Takahashi et al. ............. 707/3 | 2002/0099646 A1 | 7/2002 | Agarwal et al. |
| 6,389,452 B1 | 5/2002 | Glass | 2002/0099656 A1 | 7/2002 | Poh Wong |
| 6,401,080 B1 | 6/2002 | Bigus et al. | 2002/0112056 A1 | 8/2002 | Baldwin et al. |
| 6,408,282 B1 | 6/2002 | Buist | 2002/0123947 A1 | 9/2002 | Yuste et al. |
| 6,418,417 B1 | 7/2002 | Corby et al. | 2002/0130868 A1 | 9/2002 | Smith |
| 6,418,457 B1 | 7/2002 | Schmidt et al. | 2002/0138390 A1 | 9/2002 | May |
| 6,421,653 B1 | 7/2002 | May | 2002/0147671 A1 | 10/2002 | Sloan et al. |
| 6,424,980 B1 | 7/2002 | Iizuka et al. ................. 707/513 | 2002/0152154 A1 | 10/2002 | Rothman et al. |
| 6,429,868 B1 | 8/2002 | Dehner, Jr. et al. | 2002/0152156 A1 | 10/2002 | Tyson-Quah |
| 6,442,545 B1 | 8/2002 | Feldman et al. ............... 707/6 | 2002/0156658 A1 | 10/2002 | Selesny et al. |
| 6,446,110 B1 | 9/2002 | Lection et al. | 2002/0156719 A1 | 10/2002 | Finebaum et al. |
| 6,457,066 B1 | 9/2002 | Mein et al. | 2002/0161692 A1 | 10/2002 | Loh et al. |
| 6,460,021 B1 | 10/2002 | Kirksey | 2002/0161853 A1 | 10/2002 | Burak et al. |
| 6,480,882 B1 | 11/2002 | McAdam et al. | 2002/0169707 A1 | 11/2002 | Koek et al. |
| 6,489,954 B1 | 12/2002 | Powlette | 2002/0174043 A1 | 11/2002 | Gilbert et al. |
| 6,490,584 B2 | 12/2002 | Barrett et al. ................. 707/10 | 2002/0178096 A1 | 11/2002 | Marshall |
| 6,493,681 B1 | 12/2002 | Tertitski et al. | 2002/0184132 A1 | 12/2002 | Foster |
| 6,510,406 B1 | 1/2003 | Marchisio ...................... 704/9 | 2002/0184237 A1 | 12/2002 | McFeely |
| 6,516,303 B1 | 2/2003 | Wallman | 2002/0194097 A1 | 12/2002 | Reitz |
| 6,516,308 B1 | 2/2003 | Cohen ......................... 706/12 | 2002/0194114 A1 | 12/2002 | Erdmier |
| 6,523,022 B1 | 2/2003 | Hobbs | 2003/0004942 A1 | 1/2003 | Bird ............................... 707/3 |
| 6,556,987 B1 | 4/2003 | Brown et al. .................... 707/3 | 2003/0009411 A1 | 1/2003 | Ram et al. |
| 6,564,250 B1 | 5/2003 | Nguyen | 2003/0018558 A1 | 1/2003 | Heffner et al. |
| 6,574,377 B1 | 6/2003 | Cahill et al. | 2003/0018714 A1 | 1/2003 | Mikhailov et al. |
| 6,581,056 B1 | 6/2003 | Rao ............................... 707/5 | 2003/0033212 A1 | 2/2003 | Sandhu et al. |
| 6,581,062 B1 | 6/2003 | Draper et al. ............... 707/100 | 2003/0037174 A1 | 2/2003 | Lavin et al. |
| 6,598,028 B1 | 7/2003 | Sullivan et al. | 2003/0065594 A1 | 4/2003 | Murphy |
| 6,601,044 B1 | 7/2003 | Wallman | 2003/0066025 A1 | 4/2003 | Garner et al. ............... 715/500 |
| 6,611,825 B1 | 8/2003 | Billheimer et al. ............. 706/45 | 2003/0066032 A1 | 4/2003 | Ramachandran et al. |
| 6,615,187 B1 | 9/2003 | Ashenmil et al. | 2003/0078869 A1 | 4/2003 | Williams |
| 6,629,097 B1 | 9/2003 | Keith ............................. 707/5 | 2003/0088496 A1 | 5/2003 | Piotrowski |
| 6,631,373 B1 | 10/2003 | Otani et al. .................... 707/5 | 2003/0093360 A1 | 5/2003 | May |
| 6,633,868 B1 | 10/2003 | Min et al. ....................... 707/3 | 2003/0093362 A1 | 5/2003 | Tupper et al. |
| 2001/0011241 A1 | 8/2001 | Nemzow | 2003/0093565 A1 | 5/2003 | Berger et al. ................. 709/246 |
| 2001/0011242 A1 | 8/2001 | Allex et al. | 2003/0105981 A1 | 6/2003 | Miller et al. |
| 2001/0018674 A1 | 8/2001 | Schein et al. | 2003/0115122 A1 | 6/2003 | Slater et al. |
| 2001/0025264 A1 | 9/2001 | Deaddio et al. | 2003/0126063 A1 | 7/2003 | Reuter |
| 2001/0032217 A1 | 10/2001 | Huang ......................... 707/513 | 2003/0126068 A1 | 7/2003 | Hauk et al. |
| 2001/0042034 A1 | 11/2001 | Elliott | 2003/0126069 A1 | 7/2003 | Cha |
| 2001/0043235 A1 | 11/2001 | Best et al. | 2003/0126117 A1 | 7/2003 | Megiddo et al. ............... 707/3 |
| 2001/0044771 A1 | 11/2001 | Usher et al. | 2003/0140035 A1 | 7/2003 | Burrows ........................ 707/3 |
| 2001/0056398 A1 | 12/2001 | Scheirer | 2003/0149653 A1 | 8/2003 | Penney |
| 2002/0002530 A1 | 1/2002 | May | 2003/0154071 A1 | 8/2003 | Shreve .......................... 704/9 |
| 2002/0004777 A1 | 1/2002 | Foster et al. | 2003/0158949 A1 | 8/2003 | Miller et al. |
| 2002/0007335 A1 | 1/2002 | Millard et al. | 2003/0188255 A1 | 10/2003 | Shimizu et al. ........... 715/501.1 |
| 2002/0007358 A1 | 1/2002 | Johnson et al. ................ 707/4 | 2003/0208441 A1 | 11/2003 | Poplawski et al. |
| 2002/0013753 A1 | 1/2002 | Marks de Chabris et al. | 2003/0220861 A1 | 11/2003 | Broms et al. |
| 2002/0013862 A1 | 1/2002 | Orchard et al. | 2003/0220868 A1 | 11/2003 | May |
| 2002/0016762 A1 | 2/2002 | Feilbogen et al. | 2003/0233459 A1 | 12/2003 | Miller et al. |
| 2002/0016819 A1 | 2/2002 | Sugimoto et al. | 2003/0236862 A1 | 12/2003 | Miller et al. |
| 2002/0018077 A1 | 2/2002 | Powlette | 2003/0236957 A1 | 12/2003 | Miller et al. |

| | | | |
|---|---|---|---|
| 2004/0039692 | A1 | 2/2004 | Shields et al. |
| 2004/0064397 | A1 | 4/2004 | Lynn et al. |
| 2004/0068559 | A1 | 4/2004 | Shaw |
| 2004/0078248 | A1 | 4/2004 | Altschuler |
| 2004/0103003 | A1 | 5/2004 | Mayers et al. |
| 2004/0128169 | A1 | 7/2004 | Lusen |
| 2004/0148247 | A1 | 7/2004 | Miller et al. |
| 2004/0148259 | A1 | 7/2004 | Reiners et al. |
| 2004/0162775 | A1 | 8/2004 | Winklevoss et al. |
| 2004/0167850 | A1 | 8/2004 | Dreyer et al. |
| 2004/0220885 | A1 | 11/2004 | Salzmann et al. |
| 2004/0225596 | A1 | 11/2004 | Kemper et al. |
| 2005/0060256 | A1 | 3/2005 | Peterson et al. |
| 2005/0086170 | A1 | 4/2005 | Rao |

FOREIGN PATENT DOCUMENTS

| | | |
|---|---|---|
| WO | 01/20530 | 3/2001 |
| WO | 01/37540 | 5/2001 |
| WO | 01/57716 | 8/2001 |
| WO | 01/59670 | 8/2001 |
| WO | 02/03774 | 1/2002 |
| WO | 02/14991 | 2/2002 |
| WO | 02/054189 | 7/2002 |
| WO | 02/056146 | 7/2002 |
| WO | 02/063516 | 8/2002 |
| WO | 02/065278 | 8/2002 |
| WO | 02/065286 | 8/2002 |
| WO | 03/012588 | 2/2003 |
| WO | 03/030013 | 4/2003 |
| WO | 03/032158 | 4/2003 |
| WO | 03/065256 | 8/2003 |
| WO | 03/102733 | 12/2003 |

OTHER PUBLICATIONS

Vel et al., Minng E-Mail Content for Author Identification Forensics, Dec. 2001.*
http://www.caesius.com/ (date unknown but prior to Oct. 29, 2003).
http://www.the451.com/reports/udm.php (date unknown but prior to Oct. 29, 2003).
http://www.velocityscape.com (date unknown but prior to Oct. 29, 2003).
http://www.iopus.com/iim.htm?ref=rg8scrl (date unkonwn but prior to Oct. 29, 2003).
http://www.lencom.com/VisualWTSite.html (date unknown but prior to Oct. 29, 2003).
http://www.lencom.com/FEE.html (date unknown but prior to Oct. 29, 2003).
http://www.inxight.com/news/021029_intelliseek.html (date unknown but prior to Oct. 29, 2003).
http://www.10.org/cdrom/papers/102/ (date unknown but prior to Oct. 29, 2003).
http://www.research.ibm.com/thinkresearch/pages/2002/20020308_unstructured.shtml (date unknown but prior to Oct. 29, 2003).
http://www.downloadatoz.com/web/db-maker/ (date unknown but prior to Oct. 29, 2003).
http://www.objs.com/OSA/wom.htm (date unknown but prior to Oct. 29, 2003).
http://www.business-intelligence-site.com/knowledge18.html (date unknown but prior to Oct. 29, 2003).
http://www.data-extraction.net (date unknown but prior to Oct. 29, 2003).
"Integration Architect Schema Designers" by Data Junction (pdf) (date unkown but prior to Oct. 29, 2003).
"Customer Tempo" by Intelligent Results (pdf) (date unkow but prior to Oct. 29, 2003).
Wolfgang May, "An Integrated Architecture for Exploring, Wrapping, Mediating and Restructuring Information from the Web", Australian Database Conference, p. 82, (Jan. 31-Feb. 3, 2000).
Berthier Ribiero-Neto, et al., "Top Down Extraction of Semi-Structured Data", String Processing and Information Retrieval Symposium & amp; International Workshop on Groupware, p. 176, (Sep. 21-24, 1999).
Sharma, Rupali, et al., Phrase-based Text Representation for Managing the Web Documents; International Conference on Information Technology: Computers and Communications, p. 165 (Apr. 28-30, 2003).
Wolfgang May, Universitat Freiburg, "Modeling and Querying Structure and Contents of the Web", 10th International Workshop on Database & amp; Experts SYstems Applications, p. 721 (Sep. 1-3, 1999).
Manco, G., et al., A Framework for Adaptive mail Classification, 14th IEEE International Conference on Tools with Artificial Intelligence (ICTAI'02), p. 387, (Nov. 4-6, 2002).
Carchiolo, V., et al., "Structuring the Web", 11th International Workshop on Database and Expert Systems Applications (DEXA"00), p. 1123, (Sep. 6-8, 2000).
Lam, Sunny K.S., et al., "Querying Web Data—The WebQA Approach", p. 139, The Third International Conference on Web Information Systems Engineering (WISE"00), (Dec. 12-14, 2002).
Witten I.H., et al., "Text Mining: A New Frontier for Lossless Compression", Data Compression Conference (DCC"99), p. 198 (Mar. 29-31, 1999).
Calado, P., et al., "The Web-DL Environment for Building Digital Libraries from the Web", 2003 Joint Conference on Digital Libraries (JCDL"03), p. 346, (May 27-31, 2003).
Czejdo, B., et al., "Automatic generation of ontology based annotations in XML and their use in retrieval systems", Proceedings of the First Internatinal Conference on Web Information Systems Engineering (Jun. 19-21, 2000).
Silverman; A New Strategy for Giving Away Your Money, Wall Street Journal, D1, Oct. 6, 2004.
Investing Systems Network; Oct. 21, 2002.
Elkayam; Using Indexed Bonds to Estimate a Central Bank Reaction Function; Prelim. Draft; Apr. 11, 2002.
Ericson; Softwerc Releases Patent-Pending; November 15, 2002.
IBM Corp.; Strict Read Order Control for a Queing System; Jan. 1995.
Novell, Inc.; Beginning of Viewing Information and Viewing Basic Information About a Print Job; Publ. Jun. 1, 1993.
Hewlett-Packard; X4QUEVIEW.Org; Publ. Mar. 1992.
Electronic Trading Tools;WWW.Gheo.Com/CUSTERSERVICES/TRADING_Platforms.Asp Fast Email Extractor 4.4; WWW.LECOM.COM/FEE.HTML; Sep. 2, 2003.
Intellseek and Inxight Partner to Provide New Business Intelligence Solutions, WWW.INXIGHT.COM/NEWS/021029_ INTELLISEEL.HTML, Oct. 29, 2002.
Rupali et al.; Phrase-Based Text Representation for Managing the Web Documents; p. 165; Apr. 28, 2003.
May; Modeling and Querying Structure and Contents of the Web, 10th International Workshop on Database & Amp; Expert Systems Applications, Sep. 1, 1999, p. 721.
Roberts; Top Priority on Bottom Line: More Companies Seeting to Manage Business Risks; p. 3; Mar. 20, 2000.
Chacko; Cephalon, Inc. Taking Risk Management Gherory Seriously Pila; in Case of Emergency; Contingent Capital; No. 6, vol. 102, p. 59; ISSN 1527-5914; Sep. 1, 2001.
Kus; Contingent Capital: Just in the Capital Management Sets a New Standard; Sponsored Statement; p. 30; ISSN: 0958; Oct. 01, 2002.
Rising to the Challenge of Global STP, Euromoney Publications PLC Global Inventor, Nov. 1, 1999, pp. 51-52; ISSN. 0951-3604.
Fan et al.; The Internet and Future Financial Markets; Industry Trend or Event, Association for Computing Machinery, Inc., Sec. 11, vol. 43; Nov. 01, 2000, p. 82; ISSN: 0001-0782.
STP in the Bond Market?, Wall Street & Technology, Dec. 1, 2002, p. 20.
Tradeweb's STP Vision, Euromoney Institutional Investor PLC, SEC. 406, vol. 34, Feb. 1, 2003, p. S6; ISSN: 0014-2433.
Block Trades Market Practice, Apr. 1, 2003, pp. 1-10.
Martin; Email Report, Issue 11, Aug. 16, 2001, Printed Aug. 2, 2005.
Emery, et al.; The Measurement of Liquidity, Journal of Accounting Research, vol. 20, No. 2, Part 1, p. 290-303, Autumn 1982.
Form 10-K, United States Securities and Exchange Commission, no. Date,Year Ending Dec 31, 2003.

* cited by examiner

SYSTEM AND METHOD FOR PROCESSING PARTIALLY UNSTRUCTURED DATA

CROSS-REFERENCE TO RELATED APPLICATION

This application claims the benefit of U.S. Provisional Application No. 60/511,591, filed Oct. 15, 2003, which is hereby incorporated herein by reference.

REFERENCE TO COMPUTER PROGRAM LISTING APPENDIX

The file of this patent application includes a computer program listing appendix stored on two identical read-only Compact Discs. Each Compact Disc has the computer program listing appendix stored as a file named "appendix1.doc" that was created on Nov. 7, 2003 and is 160,768 bytes in size. This computer program listing appendix is hereby incorporated herein by reference.

FIELD OF THE INVENTION

This invention relates to a system and method for processing partially unstructured data to extract valuable information from the partially unstructured data. In particular, this invention relates to processing partially unstructured data, such as text, to extract information of interest, such as information relating to the trading of securities. This invention enables traders of securities to access a higher quantity of trade information than they would ordinarily be able to access.

BACKGROUND OF THE INVENTION

For the trader of securities, it is very important to know what the best available prices are on the street in a timely manner and to be able to use the trading opportunities that these prices present before the window of opportunity closes. Nowhere is this more important than for bond trading. Typically, a Credit Default Swap trader receives information about bond prices in the form of emails. The bulk of these emails arrive within a very short period of time around the time when the markets open, and the information contained within these emails is valuable only for a limited period of time. It is common for traders to receive hundreds of these emails in the morning. Buried within these emails are often good trading opportunities.

In the conventional arrangement, the trader had to manually read through each of these emails to find out what the prevailing bond prices are being offered on the street. However, the trader often cannot read through all of these emails before the window of opportunity closes for taking advantage of the information in these emails. For every email the trader does not have time to read, he or she misses an opportunity to earn a profit.

Further, no rigid formatting convention for these types of emails exists. They are fairly unstructured and often differ significantly from one-another. For example, an email may have lines talking about an impending vacation and then may have lines stating, "by the way, I want to sell this particular bond at this particular price." Also, the email may or may not provide all of the information commonly used to identify a particular bond. Therefore, lack of consistent formatting in emails presents a technical problem for extracting trading opportunity information from such emails with a relatively high rate of success.

SUMMARY OF THE INVENTION

These problems are addressed and a technical solution achieved in the art by this invention, which provides a system and method for processing partially unstructured data relating to financial securities. In particular, this system and method resolve first-identifying data from the partially unstructured data, resolve second-identifying data from the partially unstructured data, and determine whether a security is defined by the first-identifying data and the second-identifying data when the second-identifying data is of a predetermined type. The system and method also resolve third-identifying data from the partially unstructured data and determine whether a security is defined by the first-identifying data, the second-identifying data, and the third-identifying data. Additionally, the system and method resolve trade information relating to the security identifier from the partially unstructured data. If a security is defined by the first- and second-identifying data, or by the first-, second-, and third-identifying data, a security identifier representing the defined security is output along with the trade information relating to the security. Optionally, it is determined whether a security is unambiguously defined by the identifying data. In one embodiment, the first-identifying data represents a ticker, the second-identifying data represents a coupon or a maturity, the third-identifying data represents the other of a coupon or a maturity that the second-identifying data represents, and the predetermined type is a maturity.

Described in a different manner, the system and method identify at least one of a plurality of predefined data vectors from partially unstructured data. The partially unstructured data includes a plurality of data items having positions relative to each other in the partially unstructured data. The system and method determine a position of each of one or more data items of a first type from the plurality of data items in the partially unstructured data. A data item of a second type is selected from the plurality of data items in the partially unstructured data. The system and method also select one of the one or more data items of the first type based on its position relative to the selected data item of the second type. A data item of a third type and a data item of a fourth type are selected from the plurality of data items in the partially unstructured data. The system and method identify a predefined data vector from the plurality of predefined data vectors from the selected data item of the first type, the selected data item of the second type, and the selected data item of the third type. The data item of the fourth type and an identifier representing the identified data vector are output. Examples of data items of a first, second, third, and fourth type are a ticker, coupon, maturity, and trade information, respectively. Alternate examples of data items of a first, second, third, and fourth type are a ticker, maturity, coupon, and trade information, respectively. An example of an identifier is a CUSIP. The data items of the first, second, third, and fourth type, along with the identifier, may be stored in a context.

This invention provides a technical solution in that it processes the vast quantity of emails that a trader receives in the morning, and extracts from many of them, the identities of the securities, such as stocks and/or bonds, and trade information relating to each of the identified securities, such as bid and/or offer prices. The extracted information is then accessible to the trader in the morning when the markets open, the time period when it is needed. The invention provides much more information regarding prevailing bond prices than would normally be available if the trader has to manually read through each of the emails.

BRIEF DESCRIPTION OF THE DRAWINGS

A more complete understanding of this invention may be obtained from a consideration of this specification taken in conjunction with the drawings, in which.

DETAILED DESCRIPTION OF THE PREFERRED EMBODIMENT OF THE INVENTION

Figure 1:
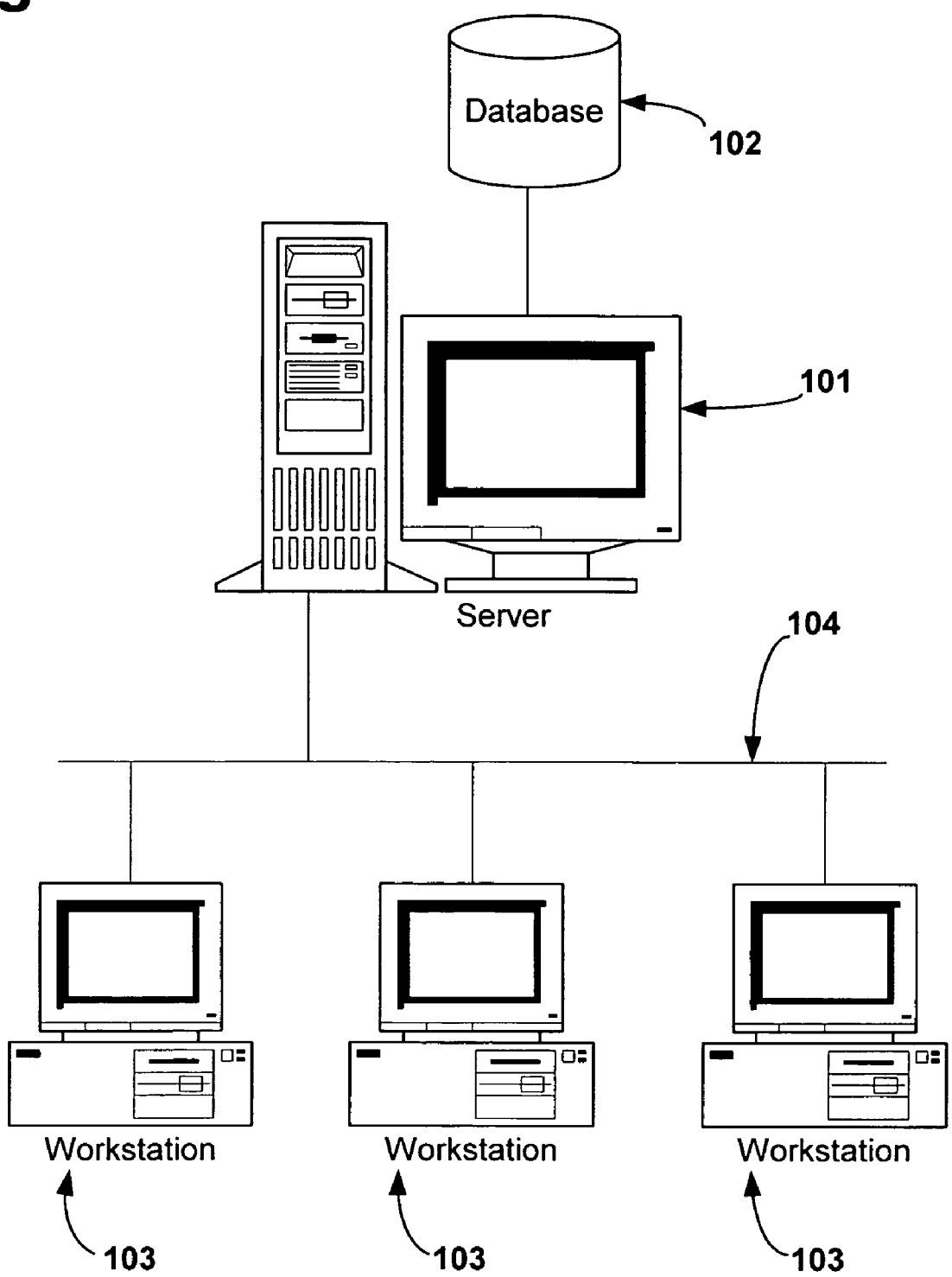
FIG. 1 is an example of a hardware arrangement implementing the preferred embodiment.

I. Definitions:

Prior to discussing the details of the preferred embodiment, several definitions of terms used throughout this specification are set forth below.

1) Ticker: a system of letters used to uniquely identify a stock or mutual fund.

2) Coupon: the interest rate stated on a bond when it's issued. Also referred to as "Rate."

3) Maturity: The length of time until the principal amount of a bond must be repaid.

4) Bid: Price at which to buy a security. A bid is considered a type of trade information relating to the security.

5) Offer: Price at which to sell a security. Also referred to as "Ask." An offer is considered a type of trade information relating to the security.

6) Token: a segment of data that can represent one of (1) a security's coupon, (2) maturity, or (3) bid and/or offer.

7) CUSIP Number or CUSIP: A number used to identify all U.S. and Canadian stocks and registered bonds. ("CUSIP" is a registered trademark of the American Bankers Association.) A security's CUSIP can be identified by its ticker, coupon, and/or maturity. Therefore, a ticker, coupon, and maturity are types of identifying information used to identify a CUSIP for a particular security. One having ordinary skill in the art will appreciate that a CUSIP could be represented as a data vector comprising the particular ticker, coupon, and maturity associated with the CUSIP in question as data items.

8) CINS Number or CINS: A number used to identify all international stocks and registered bonds. A security's CINS can be identified by its ticker, coupon, and/or maturity.

9) Ticker Domain: a region in an email that is associated with a particular ticker identified in the email, wherein if a token is located in this region, it is associated with the particular ticker.

10) Context: A set of information relating to a particular security, the information including identifying data, such as the security's ticker, coupon, maturity, and bid and/or offer prices, wherein the identifying data can be used, among other things, to identify one or more CUSIP numbers that correspond to the identifying data.

II. Description:

The preferred embodiment of this invention is described in the context of processing emails containing information relating to bonds, wherein the bonds are identified by their CUSIP number. However, one having ordinary skill in the relevant art will appreciate that the disclosed system and method can be readily adapted to process data transmitted in different manners besides email. For instance, the data can be in the form of a regular text file, an image file that has been converted to a text file, or any type of file that can be parsed by a computer to extract text information. One having ordinary skill in the relevant art will also appreciate that the disclosed system and method can be readily adapted to process data besides bonds, including other security types, such as stocks and/or mutual funds. Additionally, the disclosed system and method can be readily adapted to search for other types of identifiers besides CUSIP numbers, such as CINS numbers, or any other means to identify data, without departing from the scope of this invention.

Prior to discussing the details of the preferred embodiment, an example of a portion of an email received by a trader will be explained. Consider the following example, shown in Table I below, of an excerpt from an email received by a trader.

TABLE I

| IBM | 07/05 | 8 | 100/ |
|-----|-------|---|------|
|     | 04/07 | 10 | /230 |

In Table I, the first line refers to a single security. The letters "IBM" refer to the ticker relating to the security. "07/05" refers to a maturity month and year of the bond, "8" refers to the coupon, or rate of the security, and the "100/" is the bid price because it is followed by a "/". The second line refers to another security with the same ticker. The "04/07" refers to the security's maturity month and year, the "10" refers to the coupon, and the "/230" refers to the offer price because it is preceded by a "/".

Needless to say, most emails are not this structured, but contain the same or similar types of information. The details of how the preferred embodiment of the invention processes all of these emails, whether structured or not, will not be set forth, beginning with reference to FIG. 1.

FIG. 1 depicts a preferred hardware arrangement implementing the present invention. In FIG. 1, a server computer 101, either containing a database 102, or being in communication with a database 102, is in communication via communication mechanism 104 with one or more workstation computers 103. Any method of communicating between computers may be used between the server 101 and the workstations 103, and the server 101 and the database 102, if not contained within the server 101. The communication mechanism 104 need not be a hardwired network, and may be wireless, or a combination of both. Workstations 103 do not have to be actual desktop computers, as shown in FIG. 1, and can be other types of computers, such as laptops, hand-held devices, or any device that includes a computer.

In the preferred embodiment, the database 102 stores all of the emails received from clients, typically via the Internet, and it also stores a list of all bonds, including their ticker, coupon, maturity, and CUSIP number. Traders have access to workstations 103, where they can login to access their particular account. Logging in includes communication with the server 101 to transmit that particular trader's information to the trader's workstation 103. Also according to the preferred embodiment, the present invention is implemented as a program stored on the server 101, where it is executed to process the received emails and extract the bond CUSIP numbers and their bid and/or offer prices. However, the program can be stored on one or all of the workstations 103, and executed from any location. Also, it is possible to have the program and database all stored on a single computer.

Figure 2:
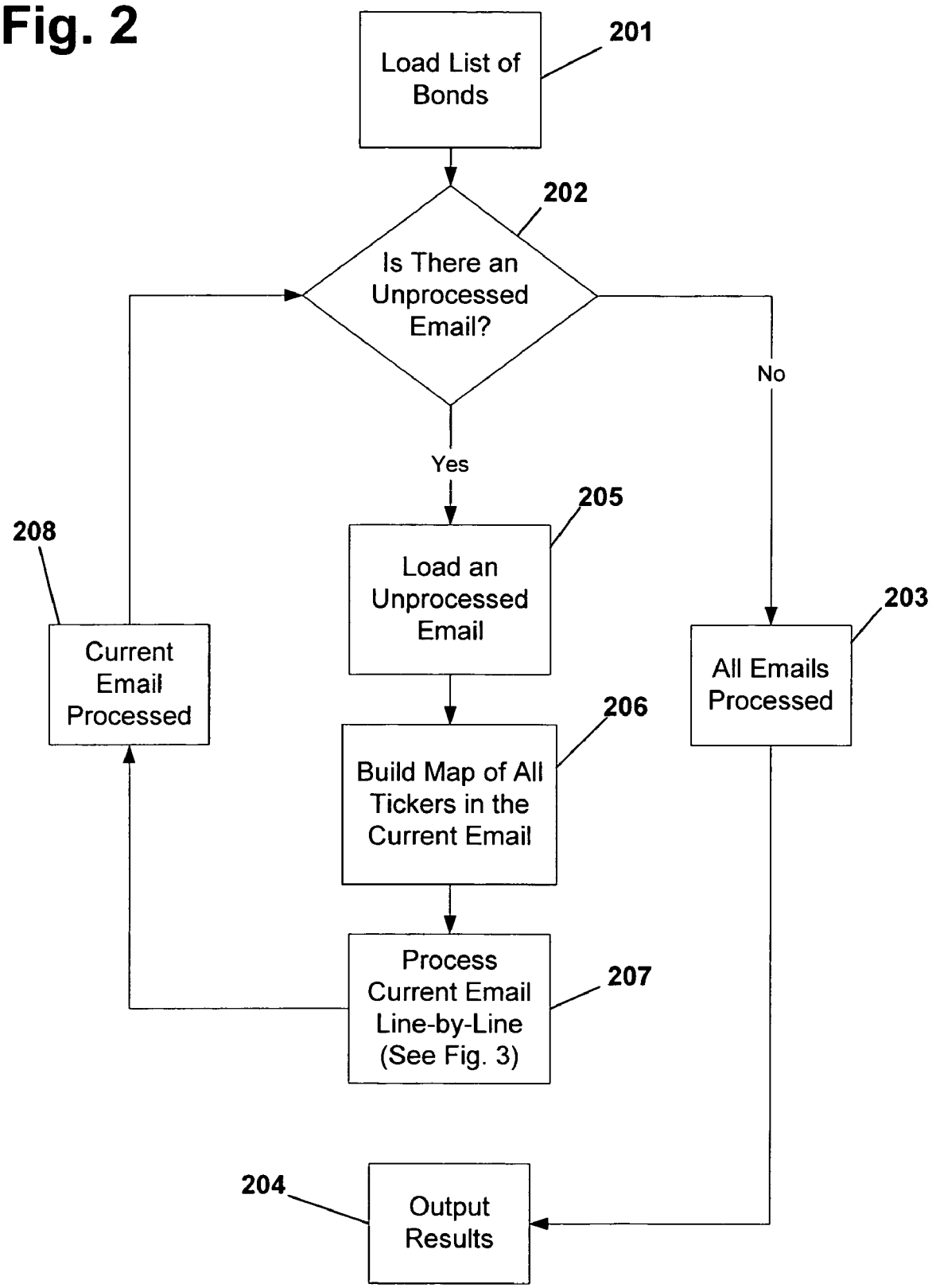
FIGS. 2-5 are flowcharts depicting the major processing steps performed by the preferred embodiment.
Figure 3:
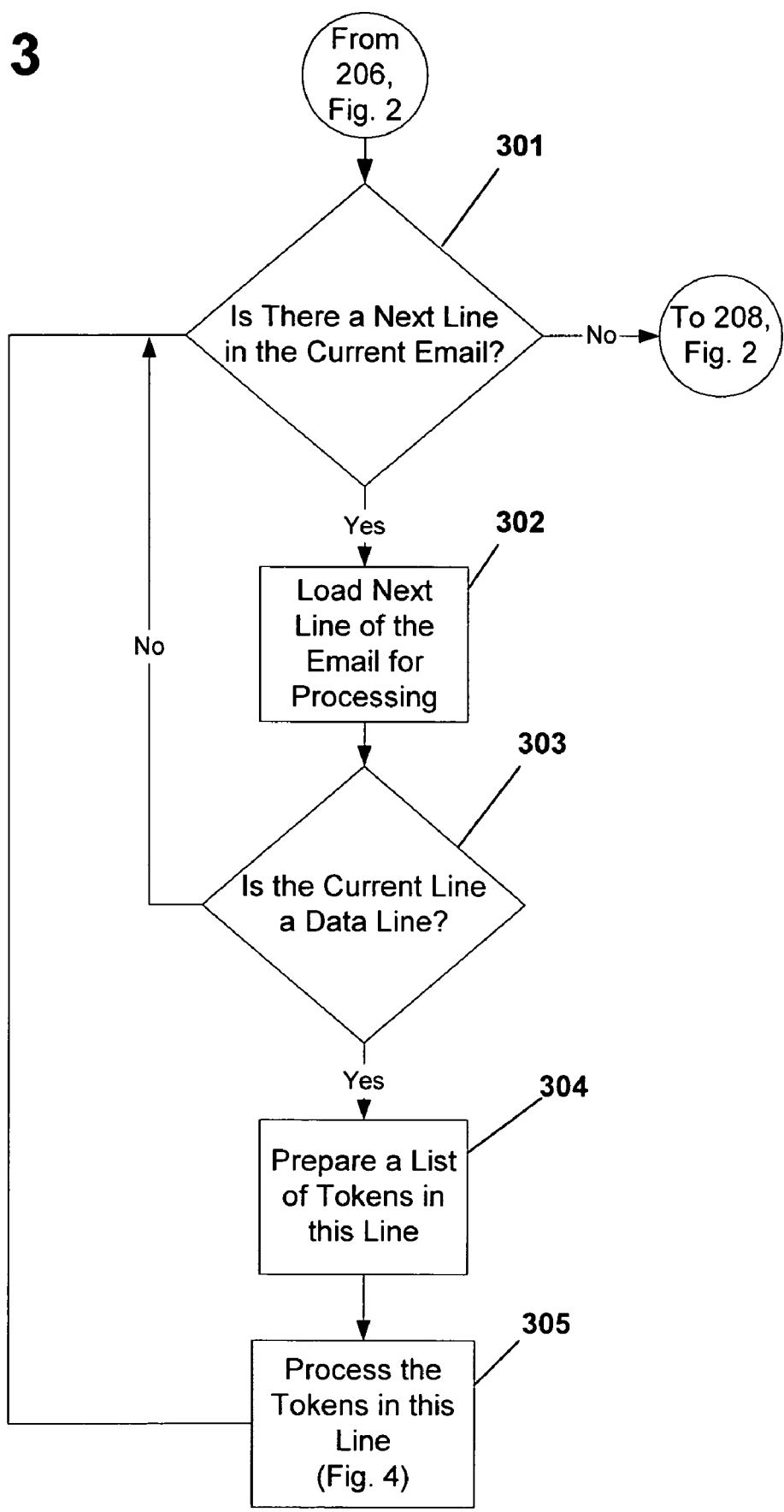
Figure 4:
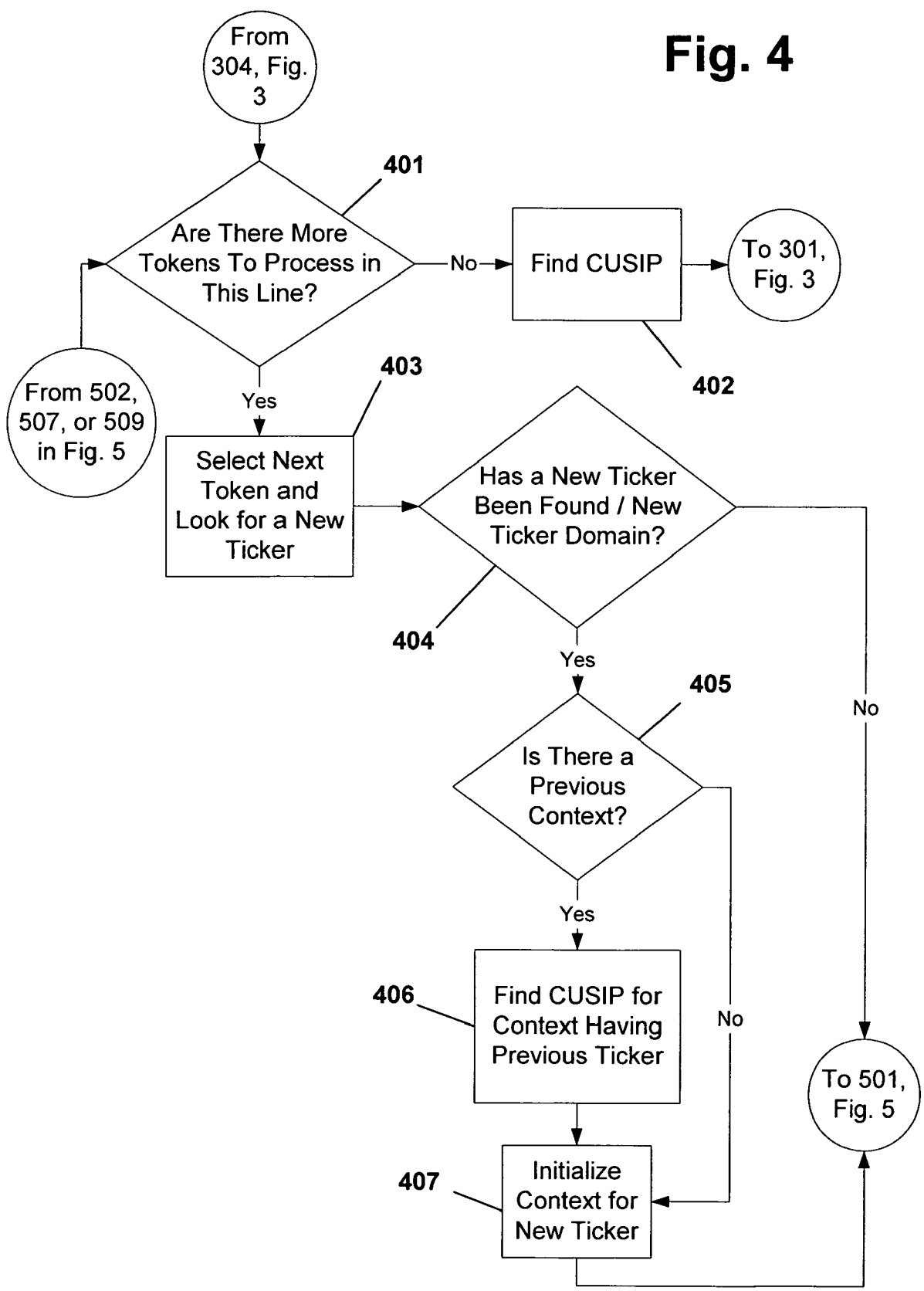
Figure 5:
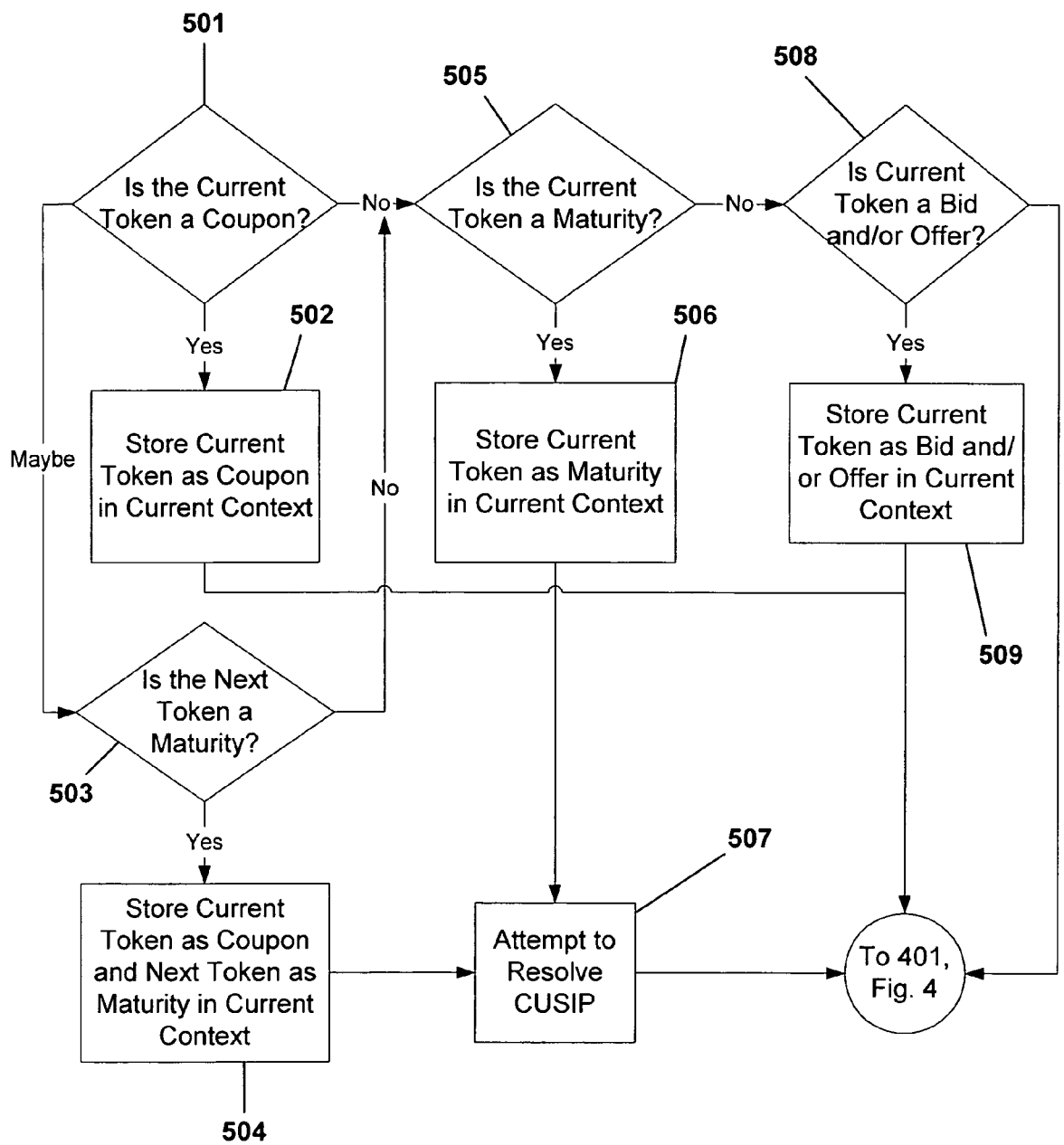

The manner of processing the emails according to the preferred embodiment of this invention will now be described with reference to FIGS. 2-5. FIG. 2 provides a high level view of the entire process performed by this embodiment. The subsequent figures, FIGS. 3-5, provide more detail regarding 207 shown in FIG. 2. With reference to 201 in FIG. 2, the list of bonds, containing each bond's ticker, coupon, maturity, and CUSIP number, is initially downloaded from the database 102 into the local memory of the computer performing the email processing, such as the server 101. Next, it is determined whether or not any unprocessed emails exist in the database 102. If none exist, it is determined that all of the emails have been processed at 203 and any bond CUSIPs and their corresponding bid and/or ask prices that have been identified through the email processing are stored in the database 102 and output via email to the traders at 204.

If unprocessed emails remain in the database 102, the next of those emails is downloaded from the database 102 and stored in local memory for processing at 205. Some initial preprocessing of the downloaded email is performed at this time to eliminate the header of the email and, optionally, to store general statistical information about the email, such as storing the number of occurrences of the word "bid" and "offer" that are present in the email. The statistical information may be useful in identifying bid and/or ask prices included in the email.

Next, a map of all of the tickers in the current email is generated at 206. The map stores each ticker name found in the email as well as its position in the email. This map will subsequently be used to determine which ticker a particular token belongs.

To identify a ticker, the preferred embodiment processes the email line-by-line. Before looking for tickers in a line, the line is preprocessed to correct formatting issues, such as making instances of "2×2" and "2x2" uniform. After the line has been preprocessed, the line is parsed one word at a time, comparing each word to the list of tickers provided by the downloaded bond list data 201. If the word matches a ticker, several checks are executed to determine if it is in fact, not a ticker, even though it matches one in the list. In particular, if the word is preceded or succeeded by a "/" or a "," followed by another word, such as "FON/AWE" or "FON,AWE", then the word is determined not to be a ticker, and it is skipped for the next word. Also, if it is a word like "cash bonds", "AT+344", "AT/+344", or "AT $544" it is determined that the word is not a ticker, and it is ignored.

If the word that matches a ticker in the list is not eliminated by the above-described checks, the word is determined to be a ticker and its position in the line of the email is recorded. If the ticker is located at the start of a set of data, then the position of the ticker is not adjusted. An example of a ticker located at the start of a set of data is shown in Table II below, wherein "FON" is the ticker.

TABLE II

| FON | 6.25 | 11 | 360-370 |
|---|---|---|---|

If the ticker is located to the right of a start of a set of data, as shown for example in Table III below wherein "BA" is the ticker, then the position of the ticker is chosen to be the first word in the line that matches a word in the issuer's name for that ticker, i.e., "BOEING". Issuer names can be provided with the downloaded bond data 201.

TABLE III

| BOEING | CAPITAL | C(BA) |
|---|---|---|
| 5.65 | 05/06 | 65-60 |

After the map of tickers is built, it is preferable to adjust the map such that if the left-most ticker in a line is not at position zero, then the positions of the tickers in that line are shifted to the left so that the left-most ticker in the line is at position zero. This simplifies subsequent processing.

At this point, a map of all tickers in the current email is generated, completing the processing described at 206 in FIG. 2. After this, the email is then processed line-by-line at 207 in an attempt to extract bond CUSIP numbers and the corresponding bid/offer prices. After all of the lines of the current email have been processed, it is determined that the current email has been completely processed at 208, and the process repeats by checking the database 102 for a next unprocessed email at 202.

Now the manner in which the email is processed line-by-line in an attempt to extract bond CUSIP numbers and the corresponding bid and/or offer prices at 207 will be described with reference to FIG. 3. At 301, it is determined whether a next, unprocessed line in the email exists. If not, execution proceeds to 208 in FIG. 2, where it is decided that the current email has been completely processed. If an unprocessed line does exist, it is marked for processing at 302. In other words, the unprocessed line is identified by a pointer, a corresponding array position, or loaded into a local variable, etc. The marked email line becomes the "current" email line for processing.

Next, it is determined whether the current email line is a data line at 303. Data line means that the current email line has data that could represent a coupon, maturity, or a bid and/or offer. To determine if the current email line is a data line, this embodiment of this invention checks for data having the format of coupons, maturities, bids or offers. For instance, the current email line must contain numbers to be a data line. Otherwise, no coupon, maturity, bid or offer is assumed to be present. Also, numbers having a "/" between them could be bid and offer. If numbers having the format of a coupon, maturity, bid, or offer are found, the current line is determined to be a data line and processing of the line continues at 304. Otherwise, it is determined not to be a data line, and the current line is skipped. Execution then proceeds to 301 to check for a next unprocessed email line.

At 304, a list of tokens in the line is prepared. For each token found, its position in the line is recorded. Preparing the list of tokens is achieved by searching the line for numbers and numbers separated by a "/" or a "-". Numbers separated by a "/" or a "-" are considered a single token. Table IV below shows examples of tokens, wherein each row in the table represents a single token.

TABLE IV

| 05/06 |
|---|
| 5.65 |
| 10 |
| 100/ |
| 90-100 |

After a list of tokens has been prepared for the current line at 304, the tokens in the line are processed to determine if they are coupons, maturities, or bids and/or offers at 305. If tokens are identified as maturities, or if all of the tokens in a line have been processed, an attempt is made to identify one or more CUSIPs for the ticker and related token(s) that have been identified. This process is discussed in more detail below, with reference to FIGS. 4 and 5. However, before discussing this process, it is helpful to first define the usage of the terms "context" and "ticker domain", which will be used throughout the remainder of this description.

A "context" is a set of stored information relating to a particular bond. This set of information includes identifying data, including the bond's ticker, coupon, and maturity, which are used to attempt to resolve a CUSIP for the particular bond. An example of two contexts is shown in Table V below.

TABLE V

| Context 1: | |
|---|---|
| Ticker: | BA |
| Coupon: | 5.65 |
| Maturity: | 05/06 |
| Bid Price: | 100 |
| Offer Price: | 95 |
| Context 2: | |
| Ticker: | BNI |
| Coupon: | Null |
| Maturity: | 12/05 |
| Bid Price: | 104 |
| Offer Price: | Null |

Although Table V shows five data fields for ticker, coupon, maturity, bid price, and offer price, the context may include more than these data fields. When a token relating to a particular context is identified as a coupon, maturity, or bid price and/or offer price, the token's data is then stored in the corresponding field of the context. For example, if a current token pertaining to the ticker BNI has the data 6.375, and such data has been identified as a coupon, the null value for the coupon field in context 2 will be replaced with 6.375.

Each context relates to one of the tickers located in the email, as mapped at 206 in FIG. 2. It is possible however, to have more than one context relating to a single ticker in the situation where several sets of coupons and maturities are described with reference to a single ticker. When the context for a particular ticker is initialized, the data fields for coupon, maturity, bid price, and ask price are set to NULL. As data for these fields are extracted from the tokens in the email, their NULL values are replaced with the newly extracted data.

A "ticker domain" is a mechanism by which a token is associated with a particular ticker, and consequently, a particular context. This allows the data from the token to be placed in the appropriate context. For example, if an email contains the lines shown in Table VI below,

TABLE VI

| BNI | | |
|---|---|---|
| 6.375 | 12/05 | 100-95 |
| | CSX | |
| 7.25 | 05/04 | 105-100 | the tokens 6.375, 12/05, and 100-95 are all in the BNI ticker domain, and their data will be stored in the context for the BNI ticker. The tokens 7.25, 05/04, and 105-100 are all in the CSX ticker domain, and will be stored in the corresponding context. The manner in which a token is associated with a ticker domain will be described later.

With a context and ticker domain defined, the processing of the tokens in a line will now be described with reference to FIG. 4, which is an exploded view of 305 in FIG. 3. The first action performed in processing the tokens in the current email line is to determine whether any unprocessed tokens exist in the current line at 401. If all of the tokens in this line have been processed, an attempt is made to resolve a CUSIP for the current context 402. The current context is the context for the ticker to which the previous token applied. In other words, if the previous token was a coupon for ticker "BA", the current context is the context for ticker "BA". It is noted that because the current line has been determined to be a data line, 303 in FIG. 3, at least one token exists in this data line, thereby preventing the scenario where the line has no token.

After attempting to resolve the CUSIP for the current context, the manner of which be explained in more detail later when discussing FIG. 5, the current line's processing is complete, and the process returns to 301 in FIG. 3, where the email is checked for another unprocessed line. If more unprocessed tokens exist in the current line, the next unprocessed token is selected as the current token and a check is made to determine if the current token is in a new ticker domain at 403. This is performed by searching for a ticker between the position of the previous token and the current token. If a ticker is found between the previous token's position and the current token's position, it is determined that the current token is in a new ticker domain. If no new ticker is found, it is determined that the current token is in the previous ticker domain and the token data, if resolved, is added to the context pertaining to that ticker. If no new ticker is found, the process proceeds to 501 in FIG. 5.

If a new ticker has been found at 404, it is determined that the current token refers to the new ticker, i.e., that it is in the new ticker's domain and a context for the new ticker should be initialized. Therefore, the previous context referring to the previous ticker will be processed. This begins with an initial check for whether a previous context exists at 405, i.e., whether this newly found ticker is the first ticker in the email. If a previous context does not exist, i.e., this is the first ticker, then a first context is initialized for the new ticker at 407. For example, if "BA" is the first ticker in the email, a first context will be initialized as shown in Table VII below.

TABLE VII

| Context 1: | |
|---|---|
| Ticker: | BA |
| Coupon: | Null |
| Maturity: | Null |
| Bid Price: | Null |
| Ask Price: | Null |

If a previous context does exist, i.e., there have been previous tickers, then an attempt is made to resolve a CUSIP for the context corresponding to the previous ticker at 406, the process of which will be described later. After the attempt to resolve the CUSIP for the previous ticker has been made, a context is initialized for the new ticker at 407.

Whether or not a previous context existed at 405, the process ultimately moves to 501 in FIG. 5, wherein an attempt is made to resolve the current token.

The first step is to determine whether the current token is a coupon at 501. This step is performed by analyzing the current token with respect to the current context. (Note that, although the following analysis is described in an order, such order is not necessarily required.) First, a check is made to find out if a coupon already exists in the current context, i.e., the coupon data field in the current context is not equal to null. If so, it is determined that the current token is not a coupon, and the processing moves on to 505 in FIG. 5. If a coupon does not exist in the current context, then the token is formatted to be in decimal form, if it is a fraction. This formatting simplifies subsequent data processing. Other formatting of the token may be performed to ensure that the token has the proper format of a coupon. Then, the formatted token is compared to the coupons in the list of bond data 201 to make certain that the formatted token has a value less than or equal to that of the maximum coupon value in the list of bond data. If the formatted token is greater than the maximum coupon value, it is determined that the current token is not a coupon, and processing proceeds to 505.

If (1) the formatted token is less than or equal to the maximum coupon value in the list of bond data, (2) a maturity exists in the current context, and (3) if the current token cannot be a bid or an offer (discussed below), then it is determined that the current token is in fact a coupon. As such, the token is deemed to be resolved, it is stored in the coupon field of the current context at 502, and processing proceeds to the next token at 401 in FIG. 4. Otherwise, several more analyses are performed on the token before concluding that it is or is not a coupon.

If the current token, in its preformatted form, i.e., its original form, is a number with a fraction, such as "11¼", then the current token is determined to be a coupon, and is stored as such in the current context at 502 and processing proceeds to the next token at 401 in FIG. 4. If the current token is preceded by a single quote, a "/", a "-", or a "0", it is determined not to be a coupon, and processing proceeds to 505.

If it is still undetermined whether or not the current token is a coupon, the preferred embodiment of this invention then looks at the next token in the line to determine if it is a maturity at 503 with the assumption that the current token is a coupon. In other words, the next token is used to provide more information about the current token. If there is no next token, it cannot be a maturity and the current token is determined not to be a coupon, and processing continues at 505. If there is a next token, it is determined whether the next token is in another ticker's domain, and consequently whether it would apply to a new context instead of the current context. If the next token is in another ticker's domain, the current token is determined not to be a coupon, and processing continues at 505. Also, if a maturity already exists in the current context, then it is determined that the next token is not a maturity and the current token is not a coupon. In this case, processing also continues at 505. Further, if the next token is a number and a fraction, it is determined that it is not a maturity and that the current token is not a coupon. Processing then proceeds to 505.

If after all of this analysis, the next token has not been resolved as a maturity, the next token is checked for compliance with a date format. If the next token is of the format MM/YY or YY or MM/YYYY, where Ms are numbers defining a month and Ys are numbers defining a year, or if the next token is a two digit integer preceded by a single quote, such as "04", then the next token is determined to have a date format. The next token may be preprocessed to remove day fields. For instance, a maturity of "12/5/04" can be preprocessed to be in the form 12/04. Although these particular formats are the preferred formats for a maturity date, one having ordinary skill in the relevant art will appreciate that the key point here is determining whether the next token has a date format. If the next token does not have a date format, it is determined not to be a maturity, and processing continues to 505, the current token still being unresolved.

If the next token does have a date format, the next token is parsed to look for data that could not relate to a date, such as the number thirteen in a position where a month would be located, or a dollar sign. If it has any of these characteristics, the next token is determined not to be a maturity, and the current token not a coupon. Processing then proceeds to 505. If the next token does not have any characteristic that would eliminate it from being a maturity, it is resolved as a maturity, and consequently, the current token is resolved as a coupon. Both the next token, resolved as a maturity, and the current token, resolved as a coupon, are stored in their respective fields in the current context at 504. In this case, processing proceeds to 507 for an attempt to resolve a CUSIP for the current context.

Anytime a token has been resolved as a maturity, as just described, an attempt is made to resolve a CUSIP for the current context. The attempt to resolve a CUSIP is performed by comparing the data in the context at issue with the data in the bond list downloaded at 201 from the database 102. The ticker, coupon, and maturity data fields in the context at issue are compared with the CUSIPs in the bond list having the same ticker, coupon, and maturity. If the coupon field in the context at issue has a null value, all CUSIPs having the same ticker and maturity as the context are identified. If the maturity field in the context at issue has a null value, all CUSIPs having the same ticker and coupon as the context are identified. (This scenario could occur if no token in a line resolved as a maturity, at 402 in FIG. 4.) All identified CUSIPs are stored for later output, and may be stored in a data field in the context itself. In the case where one or more CUSIPs cannot be identified, processing proceeds normally, without any identified CUSIPs having been stored for later output. In the particular situation where an attempt to resolve or identify a CUSIP has been made after 507 in FIG. 5, processing continues on to the next token at 401 in FIG. 4.

Turning now to 505 in FIG. 5, if it was determined that the current token was not a coupon, the current token is then analyzed to determine if it is a maturity. If the current token is determined not to be a maturity, processing continues to 508. The manner in which the current token is determined to be or not be a maturity will now be described.

If a maturity exists in the current context, a decision is made that the current token cannot be a maturity. If the token is a number with a fraction, then it is determined not to be a maturity because date fields are not of this format. Also, the token must be able to resolve into a date format to be a maturity, and if it cannot, it is decided that it is not a maturity. As discussed with reference to 503, the preferred date formats are MM/YY or YY or MM/YYYY, with day fields having been preprocessed out of the token. If the current token does not have a date format, it is determined not to be a maturity, and processing continues to 508.

If the current token does have a date format, it is parsed to find data that could not relate to a date, such as the number 13 in a position where a month would be located, or a dollar sign. If it has any characteristic that would prevent it from being a date, the current token is determined not to be a maturity. If the current token does not have any characteristic that would eliminate it from being a maturity, it is determined to be a maturity. In this case, the token is stored as a maturity in the current context at 506. Also, since a token has been resolved as a maturity, an attempt is made to resolve a CUSIP for the current context at 507. After the attempt, the current token having been resolved as a maturity, processing of the next token begins at 401 in FIG. 4.

If the current token is not a coupon (501) or a maturity (505), it is determined whether it is a bid and/or offer at 508. A token that is to be a bid and/or an offer must have the following preferred formats: "N", "N/", "/N", or "N/N", where N represents a number. Whitespace can be before or after each N or "/", and each "P" can be replaced with a "-". Also, any tokens of this form that begin with a preceding zero are determined not to be bids and/or offers because usually maturities begin with a zero. Examples of tokens that can be bids and/or offers are shown below in Table VIII.

TABLE VIII

| |
|---|
| 100/ |
| −90 |
| 60/65 |

In Table VIII, the "100 /" is a bid, the "−90" is an offer, and the "60/65" is an example of a token that includes both a bid and an offer, where the "60" is a bid and the "65" is an offer. Therefore, it is decided that the current token includes a bid if it is a number followed by a "/" or a "-", excluding whitespace. Also, if it is a number greater than or equal to 50 and is followed by the word "bid", it is determined to include a bid. Alternatively, it is determined that the current token includes an offer if it is a number preceded by a "/" or a "-", or if it is a number that is greater than or equal to fifty and is followed by the word "offer". A further optional way to help determine if the token includes a bid or an offer is to compare the number of total instances of the word "bid" or "offer" are present in the email with the number that have been processed.

If it is calculated that the current token includes a bid and/or an offer, the bid and/or offer data in the token is stored in the corresponding field(s) of the current context at 509. After storage, processing continues to the next token in the current email line at 401 in FIG. 4.

If it is calculated that the current token does not include a bid or an offer, the current token remains unresolved, and processing also continues to the next token in the current email line at 401 in FIG. 4.

Processing of the subsequent tokens in the line are the same as the process just described. Further, all of the tokens in the current line are processed, then each subsequent email line is processed (207 in FIG. 2), and when the email is completely processed (203 in FIG. 2), the stored security identifiers (CU-SIPs) and their corresponding trade information, including bid price and/or offer price, are output at 204 in FIG. 2.

III. EXAMPLE

The processing depicted in FIGS. 3-5 will now be described with respect to an example. Suppose the line of an email shown in Table IX below is loaded for processing at 302 in FIG. 3.

TABLE IX

| BAT | 5.5 | 04/04 | 65-80 | HHH | 6.5 | 06 | 80-90 |
|---|---|---|---|---|---|---|---|

At 303, it is determined that the line shown in Table IX is a data line because it contains at least the number 5.5, which could be a coupon, and the process then proceeds to 304 to prepare a list of tokens in this line. A token is considered to be a number or numbers separated by a "/" or a "-", and accordingly, the following tokens will be extracted from the line shown in Table IX: "5.5", "04/04", "65-80", "6.5", "06", and "80-90". The positions of each of these tokens in the line will also be recorded as "4", "8", "14", "24", "28", and "31", respectively, if the initial position in the line is considered to be zero.

At 305 in FIG. 3, which is elaborated upon in FIGS. 4 and 5, each of these tokens is processed as follows. At 401 in FIG. 4, it is determined that there are more tokens to process in this line because the six unprocessed tokens "5.5", "04/04", "65-80", "6.5", "06", and "80-90" remain. At 403, the first token, "5.5" is selected. Because this is the initial token, and in the case of this example, it is assumed to be the initial token in the email, the initial ticker "BAT" is identified as a new ticker at 404. Because "BAT" is the initial ticker and "5.5" is the initial token, no previous context is determined to exist at 405, and a context is initialized for ticker "BAT" at 407. This context is initialized as shown in Table X below.

TABLE X

| Context 1: | |
|---|---|
| Ticker: | BAT |
| Coupon: | Null |
| Maturity: | Null |
| Bid Price: | Null |
| Ask Price: | Null |

At 501, the process of attempting to determine if the current token "5.5" is a coupon begins. First, the current context, context 1 shown in Table X, is checked to see if a coupon already exists in the context. Because the coupon field in context 1 has a value of "Null", no coupon is determined to exist for this context and processing continues.

Next, it is determined if (1) the current token is less than or equal to the maximum coupon value in the list of bond data, (2) if a maturity exists in the current context, and (3) if the current token cannot be a bid or an offer, and if all three of these determinations are true, the current token is determined to be a coupon. However, since a maturity does not exist in context 1, this check fails and processing continues.

Next, it is determined whether the current token "5.5" is a number followed by a fraction or if it is preceded by a single quote, a "/", a "-", or a zero. If it is a number followed by a fraction or if it is preceded by a single quote, a "/", a "-", or a zero, it is determined not to be a coupon. However, "5.5" is not a number and a fraction, such as "5½", and it is not preceded by a single quote, a "/", a "-", or a zero, and processing continues.

Because the current token has not been resolved as a coupon as of yet, the next token "04/04" is checked to determine if it is a maturity at 503. But first, an inquiry is made as to whether the next token "04/04" is in a new ticker domain. However, since a new ticker is not between the position of the next token "04/04" and the position of the current token "5.5", as shown in Table IX, it is decided that the next token is not in a new ticker domain. Further, because the maturity field in context 1 is "Null", as shown in Table X, it is decided that a maturity for this context does not exist, and processing continues.

The next attempt to determine whether the next token "04/04" is a maturity includes checking it for compliance with a date format. Because "04/04" fits into a MM/YY format, where "M" represents a month digit and "Y" represents a year digit, and because "04/04" does not have any characteristics that would prevent it from being a valid date, it is resolved as a maturity and the current token "5.5" is resolved as a coupon. Therefore, the current token "5.5" is stored as a coupon in the current context, context 1, and the next token "04/04" is stored in context 1 as a maturity at 504 in FIG. 5 and as shown in Table XI below.

TABLE XI

| Context 1: | |
|---|---|
| Ticker: | BAT |
| Coupon: | 5.5 |
| Maturity: | 04/04 |

TABLE XI-continued

| Context 1: | |
|---|---|
| Bid Price: | Null |
| Ask Price: | Null |

At 507, an attempt to match one or more CUSIPs to the data in context 1 is made. That is, if any CUSIPs for ticker "BAT" with a coupon of "5.5" and a maturity of "04/04" exist, they will be identified and stored for later output. The CUSIP(s) that match the data in the current context may optionally be stored in the context itself. Whether or not one or more CUSIPs are identified, processing continues back to 401 in FIG. 4 to check for more unprocessed tokens.

The next unprocessed token is "65-80" as shown in Table IX, which is selected at 403. Since no new ticker is located between this token and the previous token, processing proceeds from 404 to 501 in FIG. 5, and the current token "65-80" is determined to be in the ticker domain of "BAT" and to apply to context 1

At 501 an attempt is made to resolve the current token "65-80" as a coupon. However, since a coupon already exists in context 1, as shown in Table XI, it is determined that the current token is not a coupon and processing proceeds to 505 to determine if it is a maturity. Similarly, because the current context includes a maturity, as shown in Table XI, the current token "65-80" is determined not to be a maturity and processing proceeds to 508 to check if it can be a bid and/or an offer.

At 508, the current token "65-80" is compared to the following bid/offer formats: "N", "N/", "/N", or "N/N", where N represents a number. Whitespace can be before or after each N or "/", and each "/" can be replaced with a "-". Also, bids and offers may not begin with a preceding zero. Because "65-80" has the format "N-N" and does not begin with a preceding zero, it is resolved as a bid and an offer and stored as such in the current context, context 1, as shown in Table XII below.

TABLE XII

| Context 1: | |
|---|---|
| Ticker: | BAT |
| Coupon: | 5.5 |
| Maturity: | 04/04 |
| Bid Price: | 65 |
| Ask Price: | 80 |

After storage of the bid and offer prices in context 1, processing continues back to 401 in FIG. 4 to find more unprocessed tokens in this line. The next unprocessed token is "6.5" as shown in Table IX. At 403, this token is selected as the current token, and the processing begins for determining what ticker domain this token belongs. To determine if the current token "6.5" is in a new ticker domain, a check is made for a ticker between the current token "6.5" and the previous token "65-80" at 403. As shown in Table IX, the ticker "HHH" is between these tokens, and an answer of "yes" is returned at 404. Context 1 now becomes the previous context at 405, and another attempt to identify one or more CUSIPs for context 1 is made at 406. After checking for CUSIPs at 406, a new context, context 2 is initialized as shown in Table XIII below.

TABLE XIII

| Context 2: | |
|---|---|
| Ticker: | HHH |
| Coupon: | Null |
| Maturity: | Null |
| Bid Price: | Null |
| Ask Price: | Null |

The processing of the current token "6.5" and the remaining tokens "06" and "80-90" with respect to context 2 are processed in the same manner as the first three tokens were processed with respect to context 1 and will not be further described. Once processing of the email is complete, the CUSIPs identified for each context, if any, along with any resolved bid and/or offer prices pertaining to each context are output. According to experimental data, the invention extracts bond information from an assortment of emails having varying degrees of structure, 60% of the time, with 5-7% being false positives.

It is to be understood that the above-described embodiment and example is merely illustrative of the present invention and that many variations of the above-described embodiment and example can be devised by one skilled in the art without departing from the scope of the invention. For example, this system and method could easily be modified to scan partially unstructured documents for other information besides CUSIP numbers, and could be used, for instance, to scan email for SPAM, check files for viruses, or routing messages without specific addresses. It is therefore intended that any such variations and their equivalents be included within the scope of the following claims.

What is claimed is:

1. A system for processing non-structured text data relating to a financial security, the system comprising:
   an input device programmed for receiving the non-structured text data; and
   A processing device programmed for performing actions comprising;
   (a) identifying, on a data item by data item basis, first-identifying data from the non-structured text data wherein the first-identifying data represents a ticker;
   (b) identifying, on a data item by data item basis, second-identifying data from the non-structured text data, wherein the second-identifying data represents a coupon or a maturity; and
   (c) determining whether a security is defined by the first-identifying data and the second-identifying data when the second-identifying data is of a predetermined type, wherein the predetermined type is a maturity.

2. A system for processing non-structured text data relating to a financial security, the system comprising:
   an input device for receiving the non-structured text data; and
   a processing device for performing actions comprising;
   identifying, on a data item by data item basis, first-identifying data from the non-structured text data, wherein the first-identifying data represents a ticker;
   identifying, on a data item by data item basis, second-identifying data from the non-structured text data, wherein the second-identifying data represents a coupon or a maturity; and
   determining whether a security is defined by the first-identifying data and the second-identifying data when the second-identifying data is of a predetermined type, wherein the predetermined type is a maturity identifying, on a data item by data item basis, third-identifying data from the non-structured text data, wherein the third-identifying data represents a coupon if the second-identifying data represents a maturity; wherein the third-identifying data represents a maturity if the second-identifying data represents a coupon; and determining whether a security is defined by the first-identifying data, the second-identifying data, and the third-identifying data.

3. The system of claim 2, wherein the processing device performs actions further comprising:

identifying trade information from the non-structured text data.

4. The system of claim 3, further comprising:

a storage device; and an output device, wherein the processing device performs actions further comprising:

storing in the storage device a security identifier representing a security determined to be defined by (a) the first-identifying data and the second-identifying data or (b) the first-identifying data, the second-identifying data, and the third-identifying data; and outputting, via the output device, the security identifier and the trade information.

5. The system of claim 2, wherein said processing device determines whether a security is defined by the first-identifying data and the second-identifying data by determining whether a security is unambiguously defined by the first-identifying data and the second-identifying data, and wherein said processing device determines whether a security is defined by the first-identifying data, the second-identifying data, and the third-identifying data by determining whether a security is unambiguously defined by the first-identifying data, the second-identifying data, and the third-identifying data.

6. The system of claim 3, further comprising:

a storage device, wherein the processing device performs actions further comprising:

storing the first-identifying data in a context in the storage device;

storing the second-identifying data in the context in the storage device;

storing the third-identifying data in the context in the storage device; and storing the trade information in the context in the storage device.

* * * * *

UNITED STATES PATENT AND TRADEMARK OFFICE
CERTIFICATE OF CORRECTION

PATENT NO. : 7,593,876 B2  Page 1 of 1
APPLICATION NO. : 10/740058
DATED : September 22, 2009
INVENTOR(S) : Srinivasan N. Rao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Twenty-eighth Day of September, 2010

David J. Kappos
*Director of the United States Patent and Trademark Office*